United States Patent [19]
Sakata et al.

[11] Patent Number: 5,457,862
[45] Date of Patent: Oct. 17, 1995

[54] METHOD OF MANUFACTURING SOLID ELECTROLYTIC CAPACITOR

[75] Inventors: Koji Sakata; Atsushi Kobayashi; Takashi Fukami, all of Tokyo, Japan

[73] Assignee: NEC Corporation, Tokyo, Japan

[21] Appl. No.: 335,389

[22] Filed: Nov. 3, 1994

[30] Foreign Application Priority Data

Nov. 10, 1993 [JP] Japan .................................... 5-280991

[51] Int. Cl.$^6$ ................................................ H01G 9/025
[52] U.S. Cl. ................................................ 29/25.03
[58] Field of Search ............................ 29/25.03; 361/525, 361/529

[56] References Cited

U.S. PATENT DOCUMENTS 4,780,796  10/1988  Fukuda et al. .................... 29/25.03

FOREIGN PATENT DOCUMENTS 1-32619   2/1989   Japan ................................... 29/25.03
3-35516   2/1991   Japan .
4-329619  11/1992  Japan ................................... 29/25.03

*Primary Examiner*—George Fourson
*Assistant Examiner*—Thomas G. Bilodeau
*Attorney, Agent, or Firm*—Sughrue, Mion, Zinn, Macpeak & Seas

[57] ABSTRACT

According to a method of manufacturing a solid electrolytic capacitor of the present invention, a surface of an anode consisting of a valve metal and having a lead extending therefrom is oxidized to form a dielectric layer. A chemical oxidation and polymerization process is performed using an oxidant, and a first conductive polymer compound layer is formed on the dielectric layer. An undoped polymer compound layer is formed on the first conductive polymer compound layer using a solution containing a polymer compound polymerized in advance and soluble in an organic solvent, and then proton acid is doped in the undoped polymer compound layer to make the undoped polymer compound layer conductive to form a second conductive polymer compound layer. A cathode electrode is formed on the second conductive polymer compound layer.

7 Claims, 2 Drawing Sheets

METHOD OF MANUFACTURING SOLID ELECTROLYTIC CAPACITOR

BACKGROUND OF THE INVENTION

The present invention relates to a method of manufacturing a solid electrolytic capacitor and, more particularly, to a method of manufacturing a solid electrolytic capacitor using a conductive polymer compound as a solid electrolyte.

A general solid electrolytic capacitor has a structure in which a molded porous body consisting of a valve metal such as tantalum or aluminum is used as an anode, an oxide coating of the valve metal is used as a dielectric, and a solid electrolyte such as manganese dioxide or a 7,7,8,8-tetracyanoquinodimethane (TCNQ) complex salt serves as part of a cathode. In this case, although the solid electrolyte has a function of electrically connecting the entire surface of the dielectric in the molded porous body to an electrode lead, the solid electrolyte desirably has a function of repairing electrical short-circuiting caused by the dielectric oxide coating defect. For this reason, a metal having a high electrical conductivity but having no dielectric repair function is not suitable as the solid electrolyte. Therefore, manganese dioxide or the like which is changed into an insulator due to heat generated by a short-circuiting current has been used as the solid electrolyte.

However, when manganese dioxide is used as part of an electrode, the impedance is high in a high-frequency range because the conductivity of the manganese dioxide is not satisfactorily high. On the other hand, when the TCNQ complex salt is used as part of an electrode, heat resistance is lowered because the TCNQ complex salt tends to be thermally decomposed. Therefore, solid electrolytic capacitors using the above materials have various problems left unsolved.

In recent years, new solid electrolyte materials have been developed in the field of polymers. As a result, various solid electrolytic capacitors using, as solid electrolytes, conductive polymer compounds obtained by doping electron donor or acceptor compounds (dopants) in conjugated polymer compounds such as polypyrrole, polythiophene, and polyaniline are proposed. For example, a method of forming a polyaniline film by polymerizing an aniline monomer on a dielectric oxide coating using an oxidant is proposed. However, according to this method, only a polyaniline film having a small thickness can be formed. For this reason, this polyaniline film may be removed from the dielectric oxide coating by thermal stress generated when a solid electrolytic capacitor is mounted. At this time, the oxide coating may be damaged, so that an increase in leakage current of the capacitor may disadvantageously occur.

In contrast to this method, a solid electrolytic capacitor manufactured by the following method is disclosed in Japanese Patent Laid-Open No. 3-35516 (Reference 1). That is, polymerized polyaniline soluble in an organic solvent is coated on a dielectric oxide coating, dried, and then doped with proton acid to make the polyaniline conductive. According to this method, a polyaniline film having a large thickness can be formed. However, the polyaniline solution used in the method cannot satisfactorily permeate the entire fine uneven surface of the dielectric oxide coating because the polyaniline solution has a very high viscosity. Therefore, only a capacitor having a considerably low capacitance reproduction ratio (i.e., the ratio of an actual electrostatic capacitance value to a design value) can be disadvantageously manufactured.

As described above, a solid electrolytic capacitor in which a conductive polymer compound obtained by polymerization on a dielectric oxide coating using an oxidant is used as a solid electrolyte has a thin solid electrolyte layer. Therefore, the dielectric oxide coating is damaged by thermal stress generated upon mounting the solid electrolytic capacitor, thereby disadvantageously increasing a leakage current.

In a solid electrolytic capacitor in which a polyaniline film made conductive by coating, on a dielectric oxide coating, polymerized polyaniline soluble in an organic solvent, drying the polymerized polyaniline, and doping proton acid in the polymerized polyaniline is used as a solid electrolyte, a polyaniline solution cannot permeate the entire fine uneven surface of the dielectric oxide coating because the polyaniline solution has a very high viscosity. Therefore, only a capacitor having a very low capacitance reproduction ratio can be disadvantageously manufactured. A method of manufacturing a solid electrolytic capacitor which simultaneously solves the above-described two problems has not been developed.

SUMMARY OF THE INVENTION

It is an object of the present invention to provide a method of manufacturing a solid electrolytic capacitor having a high capacitance reproduction ratio.

It is another object of the present invention to provide a method of manufacturing a solid electrolytic capacitor which is free from an increase in leakage current caused by thermal stress generated when the solid electrolytic capacitor is mounted.

In order to achieve the above objects, according to the present invention, there is provided a method of manufacturing a solid electrolytic capacitor, comprising the step of oxidizing a surface of an anode consisting of a valve metal and having a lead extending therefrom to form a dielectric layer, the step of forming a first conductive polymer compound layer on the dielectric layer, the step including a chemical oxidation and polymerization process using an oxidant the step of forming an undoped polymer compound layer on the first conductive polymer compound layer using a solution containing a polymer compound polymerized in advance and soluble in an organic solvent, and then doping proton acid in the undoped polymer compound layer to make the undoped polymer compound layer conductive, thereby forming a second conductive polymer compound layer, and the step of forming a cathode electrode on the second conductive polymer compound layer.

DESCRIPTION OF THE PREFERRED EMBODIMENT

Figure 1A:
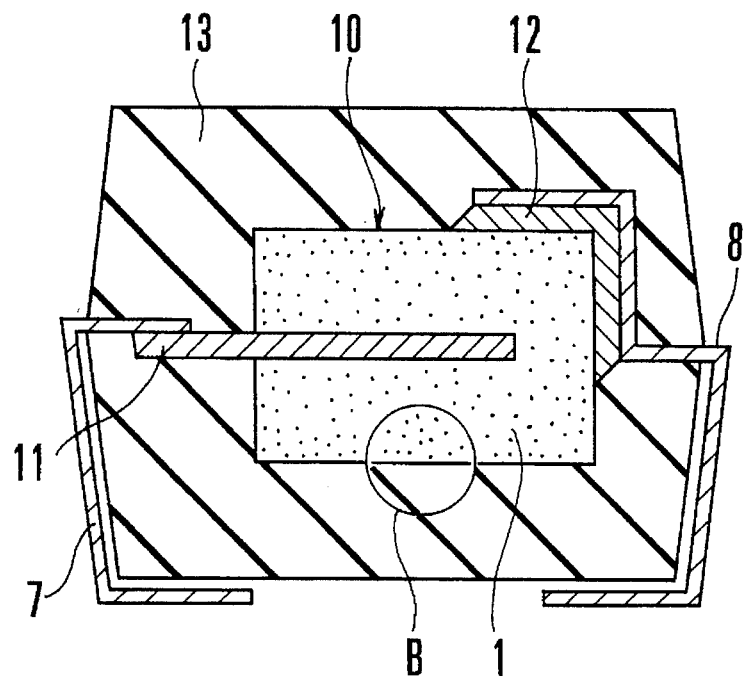
FIG. 1A is a sectional view showing a solid electrolytic capacitor manufactured by a manufacturing method according to the present invention.
Figure 1B:
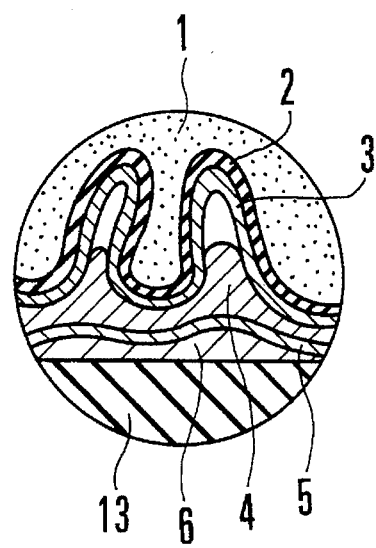
FIG. 1B is an enlarged sectional view showing a main part B of the solid electrolytic capacitor shown in FIG. 1A.

The embodiment of the present invention will be described below. FIG. 1A shows an embodiment of a solid electrolytic capacitor according to the present invention, and FIG. 1B shows a main part B of the solid capacitor in FIG. 1A. Referring to FIG. 1A, reference numeral 10 denotes a chip type capacitor element including an anode 1. One end of an anode lead 7 is welded to a lead 11 externally extending from the capacitor element 10, and one end of a cathode lead 8 is fixed to the surface of the capacitor element 10 with a conductive adhesive 12. Thereafter, the capacitor element 10 is molded with a molding resin 13.

FIG. 1B shows a surface portion B of the capacitor element 10 in FIG. 1A. Referring to FIG. 1B, the surface of the anode 1 consisting of a valve metal and constituting the capacitor element 10 is made considerably uneven to increase the surface area of the anode 1. A dielectric 2 consisting of a metal oxide is formed along the porous wall surface of the anode 1. Two conductive polymer compound layers 3 and 4 serving as solid electrolyte layers which constitute the subject matter of the present invention are sequentially formed on the surface of the dielectric 2. A cathode electrode 6 consisting of a conductive metal is formed on the conductive polymer compound layer 4. A graphite layer 5 for improving electrical connection may be formed between the cathode electrode 6 and the conductive polymer compound layer 4. In this manner, the cathode electrode 6 is formed on the entire surface of the capacitor element 10, and a cathode lead 8 is electrically connected to a portion of the cathode electrode 6 through the conductive adhesive 12.

The embodiment of the present invention will be described below in detail by way of its examples.

EXAMPLE 1

Figure 2A:
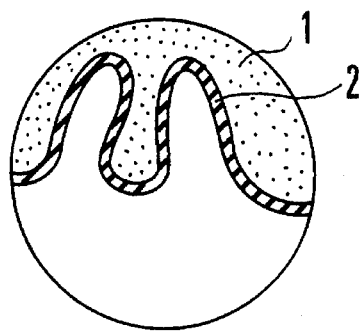
FIGS. 2A to 2C are views for explaining the steps in manufacturing the solid electrolytic capacitor according to the present invention.

A columnar pellet obtained by sintering a fine tantalum powder, constituting an anode 1, and having a length of 1 mm, a diameter of 1 mm, and a CV value (the product of an electrostatic capacitance (μF) per gram and an anodizing voltage(V)) of 23,000 μF·V/g was anodized at 60 V in an aqueous 0.1 wt % nitric acid solution to form a dielectric 2 on the surface of the pellet as shown in FIG. 2A.

Figure 2B:
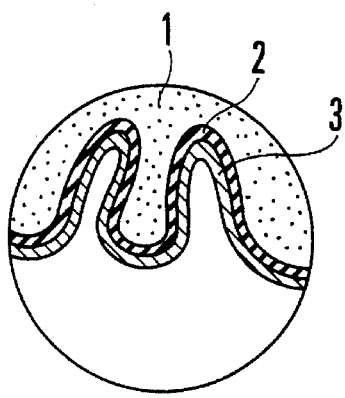

This pellet was dipped in an ethanol solution containing 20 wt % of dodecylbenzene ferric sulfonate at room temperature for 1 minute, and then dipped in a methanol solution containing 50 wt % of a pyrrole monomer at room temperature for 1 minute. Thereafter, the resultant pellet was kept in the atmospheric air for 10 minutes to perform chemical oxidation and polymerization and doping at once. The above series of processes: the process of filling the oxidant, the process of bringing the pellet into contact with the pyrrole monomer, and the process of performing polymerization and doping were performed ten times, thereby forming a black polypyrrole layer on the dielectric 2 as a first conductive polymer compound layer 3, as shown in FIG. 2B.

Figure 2C:
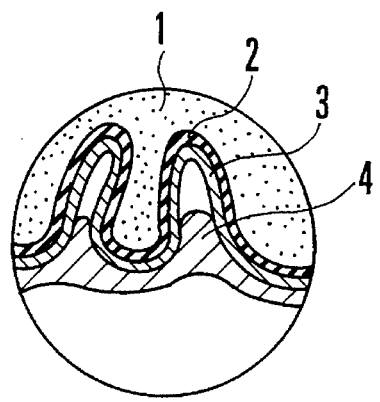

5 g of a polyaniline powder soluble in an organic solvent prepared by the conventional known method described in Reference 1 or the like were gradually added to 95 g of N-methyl-2-pyrrolidone to dissolve the polyaniline powder, thereby obtaining a blue-black solution. The pellet was dipped in this solution at room temperature for 1 minute, and then kept in an atmosphere at 100° C. to form an undoped polyaniline film. The resultant structure was dipped in an aqueous sulfuric acid solution for 30 minutes to perform doping, thereby forming a second conductive polymer compound layer 4 on the first conductive polymer compound layer 3, as shown in FIG. 2C.

In addition, a silver paste layer serving as a graphite layer 5 and a cathode electrode 6 was formed on the second conductive polymer compound layer 4, and an anode lead 7 and a cathode lead 8 extended. Thereafter, the resultant structure was sealed with an epoxy resin constituting a molding resin 13, thereby completing a solid electrolytic capacitor shown in FIG. 1A and having the sectional structure of FIG. 1B.

The capacitance reproduction ratios, impedances at 100 kHz, and leakage currents, of the completed solid electrolytic capacitor, which are obtained before and after a solder heat test (dipped at 260° C. for 10 seconds) are shown in Table 1.

EXAMPLE 2

As shown in FIG. 2A, a dielectric 2 was formed by the same method as described in Example 1 using a pellet identical to that in Example 1.

This pellet was dipped in an aqueous 30 wt % potassium dichromate solution of at room temperature for 1 minute, and then dipped in an aqueous 5 wt % aniline monomer solution containing an aniline monomer and p-toluenesulfonic acid at an equi-molar ratio at room temperature for 1 minute. Thereafter, the resultant structure was kept in the atmospheric air for 30 minutes to perform chemical oxidation and polymerization and doping to the resultant structure. The series of processes: the process of filling the oxidant, the process of bringing the pellet into contact with the pyrrole monomer, and the process of performing polymerization and doping were performed five times, as shown in FIG. 2B, to form a black polyaniline layer on the dielectric 2 as a first conductive polymer compound layer 3.

As in Example 1, 5 g of a polyaniline powder were gradually added to N-methyl-2-pyrrolidone to dissolve the polyaniline powder, thereby obtaining a blue-black solution. The pellet was dipped in this solution at room temperature for 1 minute, and then kept in an atmosphere at 100° C. to form an undoped polyaniline film. Thereafter, the resultant structure was dipped in p-toluenesulfonic acid for 30 minutes to perform doping, thereby forming a second conductive polymer compound layer 4 on the first conductive polymer compound layer 3, as shown in FIG. 2C.

In addition, a silver paste layer serving as a graphite layer 5 and a cathode electrode 6 was formed on the second conductive polymer compound layer 4, and an anode lead 7 and a cathode lead 8 extended. Thereafter, the resultant structure was sealed with an epoxy resin, thereby completing a solid electrolytic capacitor shown in FIG. 1A and having the sectional structure of FIG. 1B.

The capacitance reproduction ratios, impedances at 100 kHz, and leakage currents, of the completed solid electrolytic capacitor, which are obtained before and after a solder heat test (dipped at 260° C. for 10 seconds) are shown in Table 1.

Comparative Example 1

Figure 3:
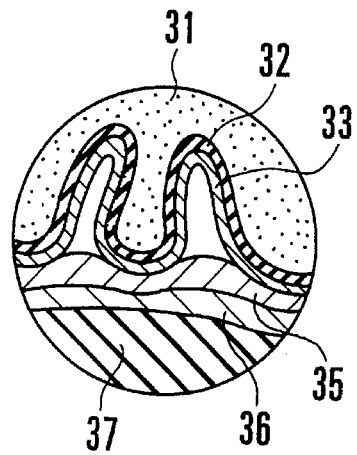
FIG. 3 is an enlarged sectional view showing the main part of a solid electrolytic capacitor manufactured by a conventional manufacturing method.

FIG. 3 shows the sectional structure of a solid electrolytic capacitor manufactured by a conventional manufacturing method. This method will be described below with reference to FIG. 3.

A dielectric 32 was formed by the same method as described in Example 1 using a pellet identical to that in Example 1.

The pellet constituting an anode 31 was dipped in an ethanol solution containing 20 wt % of dodecylbenzene ferric sulfonate at room temperature for 1 minute, and then dipped in a methanol solution containing 50 wt % of a pyrrole monomer at room temperature for 1 minute. Thereafter, the pellet was kept in the atmospheric air for 10 minutes to perform chemical oxidation and polymerization and doping at once. The above series of processes: the process of filling the oxidant, the process of bringing the pellet into contact with the pyrrole monomer, and the process of performing polymerization and doping were performed ten times to form a black polypyrrole layer on the dielectric 32 as a conductive polymer compound layer 33.

A silver paste layer serving as a graphite layer 35 and a cathode electrode 36 was formed on the conductive polymer compound layer 33, and an anode lead and a cathode lead extended. Thereafter, the resultant structure was sealed with an epoxy resin 37, thereby completing a solid electrolytic capacitor.

The capacitance reproduction ratios, impedances at 100 kHz, and leakage currents, of the completed solid electrolytic capacitor, which are obtained before and after a solder heat test (dipped at 260° C. for 10 seconds) are shown in Table 1. Comparative Example 2

Figure 4:
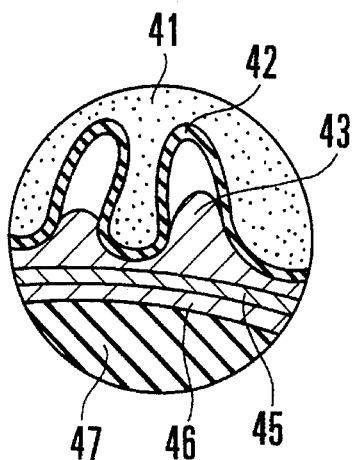
FIG. 4 is an enlarged sectional view showing the main part of a solid electrolytic capacitor manufactured by another conventional manufacturing method.

FIG. 4 shows the sectional structure of a solid electrolytic capacitor manufactured by another conventional manufacturing method. The solid electrolytic capacitor will be described below with reference to FIG. 4.

A dielectric 42 was formed by the same method as described in Example 1 using a pellet identical to that in Example 1.

5 g of a polyaniline powder soluble in an organic solvent prepared by the conventional known method described in Reference 1 or the like were gradually added to 95 g of N-methyl-2-pyrrolidone to dissolve the polyaniline powder, thereby obtaining a blue-black solution. The pellet constituting an anode 41 was dipped in this solution at room temperature for 1 minute, and then kept in an atmosphere at 100° C. to form an undoped polyaniline film. Therefore, the resultant structure was dipped in an aqueous sulfuric acid solution for 30 minutes to perform doping and to make the undoped polyaniline film conductive, thereby forming a conductive polymer compound layer 44 on the dielectric 42.

A silver paste layer serving as a graphite layer 45 and a cathode electrode 46 was formed on the conductive polymer compound layer 44, and an anode lead and a cathode lead extended. Thereafter, the resultant structure was sealed with an epoxy resin 47, thereby completing a solid electrolytic capacitor.

The capacitance reproduction ratios, impedances at 100 kHz, and leakage currents, of the completed solid electrolytic capacitor, which are obtained before and after a solder heat test (dipped at 260° C. for 10 seconds) are shown in Table 1.

TABLE 1

Capacitance Reproduction Ratio, High-Frequency Impedance, and Leakage Current

| Sample | | Capacitance Reproduction Ratio C/Co (%) | Leakage Current LC (nA) | Impedance R (mΩ) |
| --- | --- | --- | --- | --- |
| Example 1 | Before Test | 93 | 40 | 450 |
| | After Test | 91 | 75 | 480 |
| Example 2 | Before Test | 91 | 45 | 475 |
| | After Test | 89 | 83 | 483 |
| Comparative Example 2 | Before Test | 93 | 37 | 445 |
| | After Test | 85 | 5,000 | 565 |
| Comparative Example 2 | Before Test | 75 | 43 | 650 |
| | After Test | 73 | 92 | 685 |

Impedance R; measurement frequency f = 100 kHz
Test; solder heat test (dipped at 260° C. for 10 seconds)

As shown in Table 1, in each of Examples 1 and 2 of the present invention, excellent results are obtained. That is, each solid electrolytic capacitor has a high capacitance reproduction ratio and excellent impedance characteristics in a high-frequency range, and is free from an increase in leakage current caused by thermal stress generated when the solid electrolytic capacitor is mounted.

In Examples 1 and 2 described above, when the first conductive polymer compound layer 3 is to be formed on the dielectric oxide coating 2, the chemical oxidation and polymerization process and the doping process are performed at once. However, as in Example 3 (will be described next), these two processes can be separately performed as follows. That is, an undoped polymer compound layer is formed, and this layer is doped with a dopant to be conductive, thereby forming a first conductive polymer compound layer 3. Processes performed until the first conductive polymer compound layer 3 is formed will be described below.

In Example 3, a dielectric 2 is formed by the same method as described in Example 1 using a pellet identical to that in Example 1. Thereafter, the pellet constituting an anode 1 is dipped in an aqueous 20 wt % ammonium peroxodisulfate solution at room temperature for 1 minute, and then dipped in an aqueous 5 wt % aniline monomer solution at room temperature for 1 minute, thereby forming an undoped polyaniline film on the dielectric 2. The resultant structure is dipped in p-toluenesulfonic acid for 30 minutes to perform doping, thereby making the polyaniline film conductive. The above series of processes (the process of filling an oxidant, the process of bringing the pellet into contact with the aniline monomer, and the process of performing doping) are performed five times, thereby forming a conductive polyaniline film serving as a first conductive polymer compound layer 3.

As described above, in a method of manufacturing a solid electrolytic capacitor according to the present invention, the second conductive polymer compound layer 4 must be formed such that an undoped polymer compound layer is formed and then made conductive. However, the first conductive polymer compound layer 3 may be formed such that the chemical oxidation and polymerization process and the doping process are performed at once or separately.

As has been described above, according to the present invention, a conductive polymer compound layer obtained by performing a chemical oxidation and polymerization using an oxidant on a dielectric oxide coating is formed as a first conductive polymer compound layer, and a conductive polymer compound layer which is made conductive by doping proton acid in a polymer compound which is polymerized in advance and soluble in an organic solvent is formed as a second conductive polymer compound layer. Therefore, there can be provided a method of manufacturing a solid electrolytic capacitor which constitutes a solid electrolyte having a two-layered structure obtained by combining the first conductive polymer compound layer to the second conductive polymer compound layer, has a high capacitance reproduction ratio and excellent frequency characteristics, and is free from an increase in leakage current caused by thermal stress generated when the solid electrolytic capacitor is mounted.

In this case, as the first conductive polymer compound layer, one of polypyrrole and polyaniline obtained by performing chemical oxidation and polymerization using an oxidant is preferably used due to the following two reasons. First, a polymer compound which can uniformly and tightly adhere to the entire fine uneven surface of a dielectric oxide coating is preferably used. A solid electrolytic capacitor having a high capacitance reproduction ratio can be obtained by causing the polymer compound to uniformly and tightly adhere to the entire uneven surface of the dielectric oxide coating. Second, a conductive polymer compound having a high conductivity is preferably used.

A reason why a polymer compound which is polymerized in advance, soluble in an organic solvent, and made conductive by doping proton acid in the polymer compound is used as the material of the second conductive polymer compound layer is that a thick conductive polymer compound film can be easily formed. When the thick conductive polymer compound film is formed, the above problem of an increase in leakage current generated when the solid electrolytic capacitor is mounted can be solved.

When the two-layered structure is formed by combining the first conductive polymer compound layer to the second conductive polymer compound layer, the drawbacks of the two layers are compensated for each other. Therefore, a method of manufacturing a solid electrolytic capacitor which has a high capacitance reproduction ratio and excellent frequency characteristics and is free from an increase in leakage current caused by thermal stress generated when the solid electrolytic capacitor is mounted can be provided.

What is claimed is:

1. A method of manufacturing a solid electrolytic capacitor, comprising:

a step of oxidizing to form a dielectric layer on surfaces of an anode consisting of a valve metal having a lead extending therefrom;

a step of forming a first conductive polymer compound layer on said dielectric layer including a chemical oxidation and polymerization process;

a step of forming an undoped polymer compound layer on said first conductive polymer compound layer using a solution containing a polymer compound polymerized in advance of forming said undoped polymer compound layer and soluble in an organic solvent, and then dipping said undoped polymer compound layer in acid to make said undoped polymer compound layer conductive, thereby forming a second conductive polymer compound layer; and the step of forming a cathode electrode on said second conductive polymer compound layer.

2. A method according to claim 1, wherein the step of forming said first conductive polymer compound layer includes the step of repeatedly performing a series of processes consisting of a process of dipping said anode, on which said dielectric layer is formed, in a solution containing an oxidant, a process of dipping said anode in a solution containing a pyrrole monomer, a process of performing chemical oxidation and polymerization of said pyrrole monomer, and a process of doping said polymerized monomer.

3. A method according to claim 2, wherein said first conductive polymer compound layer consists of polypyrrole, and said second conductive polymer compound layer consists of polyaniline.

4. A method according to claim 1, wherein the step of forming said first conductive polymer compound layer includes the step of repeatedly performing a series of processes consisting of a process of dipping said anode, on which said dielectric layer is formed, in a solution containing an oxidant, a process of dipping said anode in a solution containing an aniline monomer, a process of performing chemical oxidation and polymerization of said aniline monomer, and a process of doping said polymerized monomer.

5. A method according to claim 4, wherein said first and second conductive polymer compound layers are constituted by polyaniline films, respectively.

6. A method according to claim 1, wherein the step of forming said first conductive polymer compound layer comprises the step of forming an undoped polymer compound layer on said dielectric layer using a solution containing a polymer compound which is polymerized in advance of forming said undoped polymer compound layer and soluble in an organic solvent, and the step of dipping said undoped conductive polymer compound layer in acid to make said undoped polymer compound layer conductive, thereby forming said first conductive polymer compound layer.

7. A method according to claim 1, wherein the valve metal constituting said anode is tantalum.

* * * * *